Patented Dec. 22, 1942

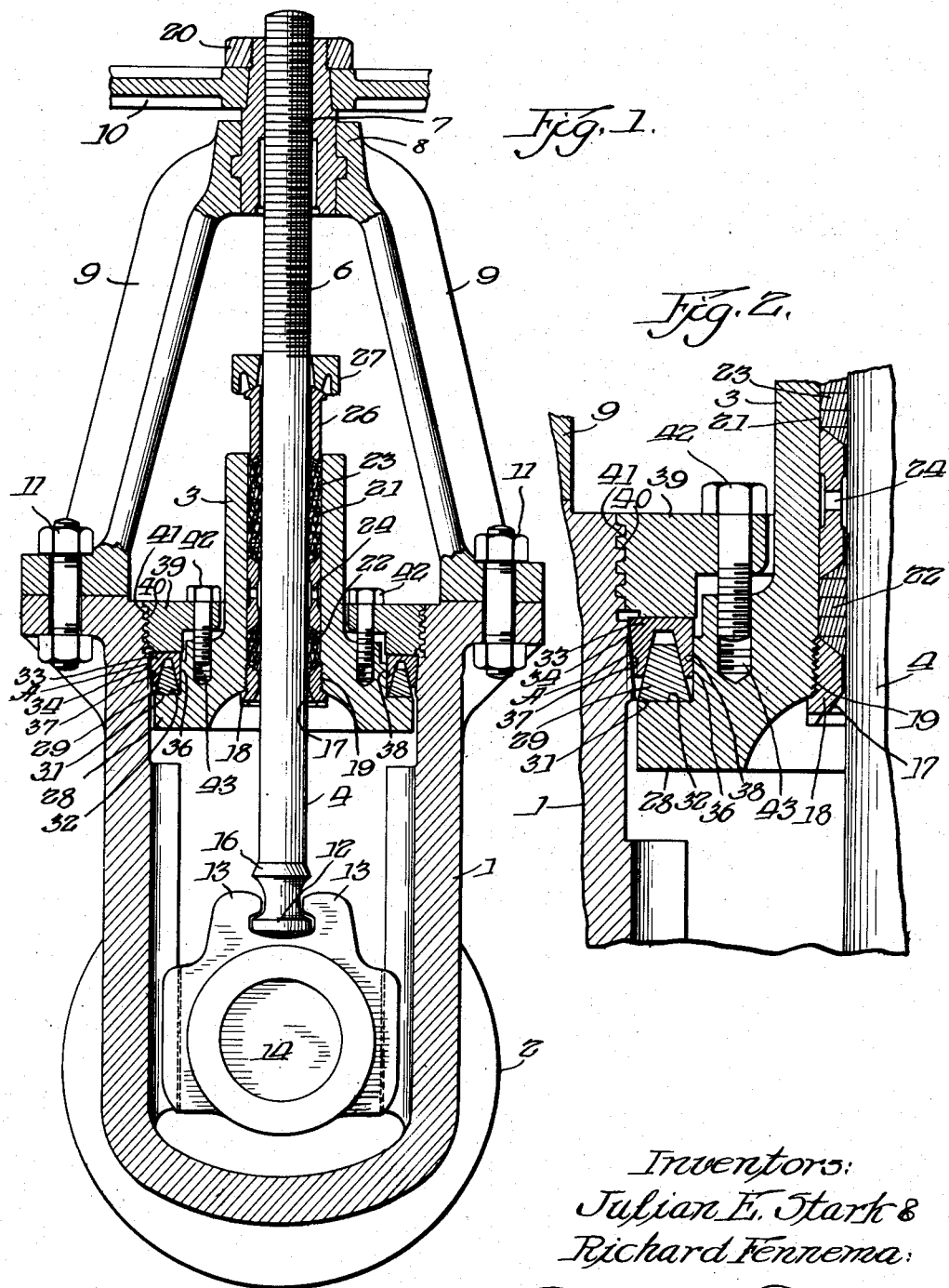

2,305,589

UNITED STATES PATENT OFFICE 2,305,589

PRESSURE SEALED JOINT

Julian E. Stark, Wilmette, and Richard Fennema, Chicago, Ill., assignors to Crane Co., Chicago, Ill., a corporation of Illinois Application February 3, 1941, Serial No. 377,136

3 Claims. (Cl. 220—46)

Broadly our invention relates to an improved closure member for pressure vessels, such as valves or the like in which the internal line pressure being carried is utilized for the fluid sealing purpose. More particularly, our invention relates to an improved bonnet joint or closure for a valve or pressure vessel in which such a pressure-sealing joint may be used to great advantage, especially in consideration of constantly increasing pressures encountered in normal service.

In the majority of present-day pressure vessels, especially in valves and related fittings, the construction of joints and cooperating closure members is such that the line pressure is normally opposed to the fluid seal, that is, line pressure tends to spread the sealing surfaces with resulting leakage occurring between them. Well known examples are the commonly used threaded joints, flanged joints, ring joints, tongue and groove joints, and ball joints.

In very few cases, and then only for very specialized services, closure means have been constructed which utilize the pressure within the vessel for the sealing purpose. These have not been entirely satisfactory for general use especially where varying high pressures and temperature conditions exist as their limited commercial application indicates.

It is therefore our purpose to disclose a novel means for constructing a closure member for pressure vessels which is relatively light in weight, avoiding the usual heavy flanges, also being economical to manufacture, easily utilized on high pressure and high temperatures with little likelihood of leakage resulting even when such service conditions are substantially variable. A further advantage of our invention is that the construction may be readily assembled before use and disassembled after use in a relatively shorter time than previously, with a big reduction in the effort required.

Another object of our invention lies in the construction of a valve in which the yoke- or stem-supporting member is directly connected to the body or casing independently of the connection featuring the pressure seal.

Another purpose of our invention is the provision of a fluid-sealing joint for pressure vessels which will remain fluid-tight even under conditions of widely fluctuating temperatures.

Another purpose lies in the provision of a pressure-tight joint which requires no periodical retightening of bolt-studs or the usual attention of frequent adjustment or inspection after initial assembly has been completed.

Other objects and advantages will become more readily apparent from the following detailed description, illustrated in the accompanying drawing, in which Fig. 1 shows one form of our invention as applied to the body-bonnet joint of a high pressure gate valve.

Fig. 2 is a magnified fragmentary section of the joint itself.

Like parts are designated by the same reference characters in all figures in the drawing.

Referring to Fig. 1, we have chosen for purposes of illustration only a conventional valve in connection with our present invention, this type of valve being known to those skilled in the art as a solid wedge disc gate valve. The valve comprises in general the usual parts consisting of a body or casing 1 having ports or passages therethrough which are provided with means for connecting with a pipe-line, provided for instance with the flanges 2 (only one of which is shown) which are drilled for bolting (bolt holes not shown). The bonnet member generally designated 3 is connected to the casing 1 by means of our novel pressure seal type of joint hereinafter to be described in detail. A stem 4, having formed at its upper end the screw threads 6 which are engaged with like threads 7 formed in a rotatable yoke sleeve 8, is adapted to move axially on relative rotation of the yoke sleeve 8 by means of a handwheel or operating lever 10 which is suitably connected thereto and held in place by the wheel nut 20. The yoke sleeve 8 is thus rotatably supported by means of the individual yoke members 9 which are bolted together at the upper end by means of the usual bolts (not shown) and are fastened directly to the body 1 by the bolts 11. The lowermost end of the stem 4 is provided with a conventional T head 12 for engagement with jaws or hook portions 13 of the solid wedge disc or the closure member 14, the latter member being adapted to contact seating surfaces in the casing 1 for the purpose of interrupting or stopping the flow of fluid through the valve. The stem 4 is provided with a frusto-conical back-seating surface 16 which is adapted to seat a similarly shaped surface 17 in the back-seating bushing 18 which is threaded upwardly and shouldered into the bonnet 3 by means of the threads 19. When the stem is moved upward to the limit of its travel, the abutment of the surfaces 16 and 17 causes the packing chamber generally designated 21 to be sealed off from the interior of the valve, thus allowing the packings 22 or 23 or the packing spacer 24 to be replaced or repaired without taking the valve from service. A cylindrical packing gland 26 has its lower end portion inserted into the packing chamber 21 and is adapted to compress the packing 23 by the downward movement of the gland follower member 27, the latter being movable downwardly by any suitable means as, for instance, by vertical bolts (not shown) connecting the gland follower 27 to the bonnet 3.

Referring now more particularly and in detail to our improved pressure sealing joint itself, the bonnet 3 has formed at its lowermost end a flanged portion 28. A gasket ring 29 of trapezoidal cross-section (although not necessarily so) has its lower surface 31 normally in forcible abutment with the upper surface 32 of the flange 28. A second gasket ring 33 having an inverted U-shaped groove 34 in its lower face is fitted over the trapezoidal ring 29 in such a manner that forced telescopic contraction of the rings 29 and 33 causes the surfaces 34 and 36 of the ring 33 to expand radially inwardly and outwardly into fluid-sealing contact with the surfaces 37 in the body and 38 on the bonnet member 3 respectively. A circular back-up or supporting member 39 is preferably threaded into the casing 1 into abutment with the gasket member 33 by means of the screw threads 40 and 41 respectively in the casing 1 and on the supporting member 39 which are preferably of large pitch and a fairly loose fit in order to facilitate disassembly. The screw threads 40 and 41 may be formed continuous about the peripheries of the casing and the back-up member whereby the two are assembled by continuous rotation of the one with respect to the other. Alternatively the threads may be made discontinuous or interrupted in a similar manner whereby rapid assembly may be carried out simply by mating threaded peripheral portions of the one with unthreaded peripheral portions of the other, then moving the supporting member axially the desired distance into the casing and rotating to interlock the threads. To make the bonnet easy to remove from the body, the surfaces 34 and 37 on the ring 33 and the casing 1, respectively, are preferably formed frusto-conically, having a slight angle A with respect to the vertical axis. Where desired, easy removal of the ring member 33 from the bonnet may be made possible by constructing the body surface 38 and the ring surface 36 with an angle disposed oppositely from angle A thereby forming similar, but downwardly enlarging, frusto-conical surfaces.

We have found that for either angle 2 degrees is quite satisfactory and allows for ready dismantling and removal of the gasket even after the most severe operating conditions.

To assemble such a valve as we have illustrated, the casing 1 is conveniently, but not necessarily, placed in an upright position and the bonnet assembly including the stem 4, the disc 14, packing, etc., is lowered into the casing; the gasket rings 29 and 33 are lowered into the annular space between the body and the bonnet; the back-up ring 39 is screwed down to the desired predetermined position; the gasket rings 29 and 33 are drawn snugly together by means of a number of cap screws 42 which extend through the back-up ring 39 and into the holes 43 drilled and tapped in the bonnet 3. In operation, these cap screws 42 serve to limit the downward movement of the bonnet with respect to the casing. The cap screws 42 need not be large and usually three or four are quite sufficient, since their main purpose is to hold the named units together when there is no pressure within the valve. Just as soon as line pressure has been allowed to act upon the inner surface of the bonnet 3, the gasket expander ring 29 is forced upward into the gasket ring 33, expanding the outer surfaces of the latter into fluid-sealing abutment with the peripheral surfaces of the body and the bonnet. It will be apparent that the cap screws 42 may then actually be removed without affecting the tightness of the joint in any way, line pressure being the sole means for maintaining joint tightness. Thus to complete the assembly of the valve, the yoke sleeve 8 with a handwheel 10 attached by a wheel nut 20 is threaded onto the upper part of the stem 4 and then the individual yoke members 9 are bolted onto the casing, forming a direct connection between the yoke sleeve and the body or casing 1.

This manner of attaching the yoke members is novel in that conventional valves have them connected from the yoke sleeve to the bonnet itself. This conventional method would have serious drawbacks if combined with the pressure-sealing joint we have disclosed for, in raising the disc from a fully seated position, a tremendous downward force would be applied on the bonnet, enough in some cases to possibly break the seal and cause fluid to leak past the gasket members. Our method of attaching the yoke is therefore preferred because it prevents application of loads to the bonnet which would counteract the pressure loads required to keep a tight joint and allows the bonnet 3 to "breathe" or reciprocate axially under varying internal pressures and maintain a tight fluid seal at all times between the bonnet and the body.

It is well known that packing encircling a movable shaft, as in the chamber 21, will often stick to the shaft unless the latter is moved occasionally. In some services such periodic movement is impractical due to interruption of operating schedules or other reasons. An additional advantage possessed by our valve is that the bonnet 3 containing the packing chamber 21 will "breathe" or reciprocate axially along the shaft or stem as the internal pressure fluctuates or varies and thus tend to prevent the packing from sticking or freezing to the stem.

We prefer to make the gasket rings 29 and 33 of a material which resists substantial permanent deformation at high temperatures and high internal valve pressures. For example, we have had satisfactory results with a number of materials having a high modulus of elasticity and high compressive strength, such as ordinary steel or steel alloys. Likewise, advantageous results have been obtained with hard gasket materials which have low moduli of elasticity and high compressive strengths, such as cast iron.

While we have described our joint as particularly applicable to valves and have disclosed a new method of supporting the stem in any valve in which our joint is employed, it should nevertheless be obvious that it is applicable to a valve not having a stem and to any kind of a pressure vessel where access to the interior must be provided without the necessity of cutting a welded joint or otherwise destroying or permanently modifying a part of the structure. Accordingly, we desire to be limited only within the spirit of the appended claims.

We claim:

1. In a pressure vessel, a casing having an opening therein, an axially movable cover member positioned within said opening, a combined supporting and retaining member removably positioned within said opening exteriorly of said cover member and adapted to limit outward movement thereof, the said cover member having a flanged portion extending beneath the said combined retaining member and interiorly thereof, the said casing and the said cover member forming therebetween an annular chamber, gasket means positioned within the latter chamber comprising a pair of telescopicable annular members, the first member being an expander ring of substantially trapezoidal cross-section and the second member being a sealing ring of substantially U-shaped cross-section, the said latter ring being adapted to fit telescopically over the said expander ring, the expander ring and sealing ring being positioned in the chamber to contact the flange portion and retaining member respectively, whereby upon application of pressure to the inside of said axially movable cover member the latter is moved axially outward compressing said gasket means between said flanged portion of said cover member and the said combined retaining member and expanding peripheral portions of the said sealing ring into fluid-sealing contact with the said casing and the said cover member.

2. In a pressure vessel, a casing having an opening therein, an axially movable cover member positioned within said opening, a retaining member removably positioned within said opening exteriorly of said cover member and adapted to limit outward movement thereof, the said cover member having a flanged portion extending beneath the retaining member and interiorly thereof, the said casing and the said cover member forming therebetween an annular chamber, gasket means positioned within the latter chamber comprising a substantially U-shaped gasket member arranged to receive an annularly extending spreader member, the latter member being positioned within the gasket member and adapted to expand the said gasket member radially without permanent deformation of the latter member, the spreader member and the U-shaped gasket being placed in the said chamber to contact the flange portion and the said retaining member respectively.

3. Means for retaining and sealing the bonnet member of a valve comprising a casing having an opening in addition to the usual inlet and outlet ports, a bonnet member positioned within said opening and having limited relative axial movement, said bonnet and said casing having therebetween an annular space containing a pair of telescopically positioned gasket members, the first of the latter being a sealing ring having a groove formed in one face thereof, the second being an expander ring of wedge-shaped cross-section and adapted to fit within the groove of said sealing ring in such a manner as to expand said sealing ring radially when the two rings are urged telescopically together, a removable back-up member mounted within said opening, the upper of the said gasket members bearing against the said back-up member and the lower of the said gasket members bearing upon a flanged extension of the said bonnet, whereby internal pressure causes the said bonnet to move axially upward and to compress the said gasket members between the said flanged extension and the said back-up member, the further compression of the said gasket members resulting in the outward expansion of the walls of the said sealing ring into respective fluid-sealing contacts with the said casing and the said bonnet member.

JULIAN E. STARK.
RICHARD FENNEMA.